US009546913B2

(12) United States Patent
Lesmeister et al.

(10) Patent No.: US 9,546,913 B2
(45) Date of Patent: Jan. 17, 2017

(54) ROBUST STATOR WINDING TEMPERATURE SENSOR

(75) Inventors: Brad Lesmeister, Prior Lake, MN (US); Peter David Bernier, Minneapolis, MN (US); Mark Stewart, Brooklyn Park, MN (US)

(73) Assignee: MEASUREMENT SPECIALTIES, INC., Hampton, VA (US)

( * ) Notice: Subject to any disclaimer, the term of this patent is extended or adjusted under 35 U.S.C. 154(b) by 845 days.

(21) Appl. No.: 13/595,944

(22) Filed: Aug. 27, 2012

(65) Prior Publication Data

US 2013/0136153 A1 May 30, 2013

Related U.S. Application Data

(63) Continuation of application No. 12/174,242, filed on Jul. 16, 2008, now Pat. No. 8,251,579.

(Continued)

(51) Int. Cl.
*G01K 1/14* (2006.01)
*G01K 1/08* (2006.01)
(Continued)

(52) U.S. Cl.
CPC .............. *G01K 7/16* (2013.01); *H02K 11/25* (2016.01); *Y10T 29/49171* (2015.01)

(58) Field of Classification Search
CPC ... G01R 31/343; G01R 31/34; H02K 11/0047; H02K 11/001; H02K 9/06; H02P 29/0044; H02P 29/0061; G01K 13/00; G01K 13/08; G01K 7/16; G01K 7/00; G01K 1/08; G01K 1/14; Y10S 388/934
(Continued)

(56) References Cited

U.S. PATENT DOCUMENTS 2,530,256 A   11/1950   Malek
2,619,573 A   11/1952   Dawson, Jr.
(Continued)

FOREIGN PATENT DOCUMENTS

DE   102010030968 B4 *   2/2012
JP       57079689 A         5/1982

OTHER PUBLICATIONS

"U.S. Appl. No. 10/391,531, Final Office Action mailed Apr. 23, 2007", 19 pgs.
(Continued)

*Primary Examiner* — Gail Kaplan Verbitsky
(74) *Attorney, Agent, or Firm* — Howard IP Law Group, P.C.

(57) ABSTRACT

Disclosed herein, among other things, is a stator winding temperature sensor. According to an embodiment, the sensor includes at least one sensing wire coil adapted to be connected to a stator. The sensor also includes a body, including a core material surrounding at least a portion of the sensing wire coil, and a laminate material over the core material. The body has a thickness adapted to protect the sensing wire coil. The sensor includes a lead wire adapted to connect to an external monitoring device. The sensing wire coil is electrically connected to the lead wire at a lead step portion of the sensor. In addition, the sensor includes a tab extending from the lead wire and encompassing the lead step. The tab protects the lead step and the sensing wire coil in a region where the sensor extends over an end of the stator.

19 Claims, 5 Drawing Sheets

Related U.S. Application Data

(60) Provisional application No. 60/950,066, filed on Jul. 16, 2007.

(51) Int. Cl.
 *G01K 13/00* (2006.01)
 *G01K 7/16* (2006.01)

(58) Field of Classification Search
 USPC ....... 374/100, 141, 144, 152, 163, 185, 153, 374/179, 208; 73/866.5; 338/13, 338/22 R, 28, 154
 See application file for complete search history.

(56) References Cited

U.S. PATENT DOCUMENTS

| | | | |
|---|---|---|---|
| 2,717,945 A * | 9/1955 | Briggs et al. | 338/26 |
| 2,749,753 A | 6/1956 | Adams | |
| 2,758,294 A | 8/1956 | Duncan | |
| 2,802,925 A | 8/1957 | Seelen et al. | |
| RE24,436 E | 2/1958 | Jacobson et al. | |
| 2,945,265 A | 7/1960 | Sell, Jr. et al. | |
| 2,994,219 A | 8/1961 | Schaschl | |
| 3,049,012 A | 8/1962 | Daniels | |
| 3,165,426 A | 1/1965 | Beckam | |
| 3,339,164 A | 8/1967 | Landis et al. | |
| 3,343,589 A | 9/1967 | Holzl | |
| 3,589,360 A | 6/1971 | Sinclair | |
| 3,975,720 A | 8/1976 | Chen et al. | |
| 4,042,900 A | 8/1977 | Hinton et al. | |
| 4,122,322 A | 10/1978 | Ohkubo et al. | |
| 4,224,461 A * | 9/1980 | Snyder, Jr. | G01K 7/04 136/230 |
| 4,289,553 A | 9/1981 | Nolf | |
| 4,369,795 A | 1/1983 | Bicher | |
| 4,419,169 A | 12/1983 | Becker et al. | |
| 4,437,084 A | 3/1984 | Clayton, Jr. | |
| 4,527,909 A | 7/1985 | Dale et al. | |
| 4,553,023 A | 11/1985 | Jameson et al. | |
| 4,607,154 A | 8/1986 | Mills | |
| 4,698,756 A * | 10/1987 | Gonzalez et al. | 702/130 |
| 4,827,487 A * | 5/1989 | Twerdochlib | 374/152 |
| 4,848,926 A | 7/1989 | Jenkins | |
| 4,863,280 A * | 9/1989 | Doemens | 374/119 |
| 4,977,385 A | 12/1990 | McQueen | |
| 4,994,780 A | 2/1991 | McQueen | |
| 5,161,894 A | 11/1992 | Bourigault | |
| 5,221,916 A | 6/1993 | McQueen | |
| 5,226,731 A * | 7/1993 | Allen | 374/124 |
| 5,460,041 A | 10/1995 | Andes et al. | |
| 5,666,593 A | 9/1997 | Amico | |
| 5,749,656 A | 5/1998 | Boehm et al. | |
| 5,769,622 A | 6/1998 | Aoki et al. | |
| 5,831,511 A | 11/1998 | Manning et al. | |
| 5,833,688 A | 11/1998 | Sieben et al. | |
| 5,864,282 A | 1/1999 | Hannigan et al. | |
| 5,889,460 A | 3/1999 | Bachmann et al. | |
| 5,906,584 A | 5/1999 | Pavoni et al. | |
| 5,938,624 A | 8/1999 | Akerfeldt et al. | |
| 5,955,960 A | 9/1999 | Monnier | |
| 5,959,524 A | 9/1999 | Wienand et al. | |
| 5,999,081 A | 12/1999 | Hannigan et al. | |
| 6,028,382 A | 2/2000 | Blalock | |
| 6,078,830 A | 6/2000 | Levin et al. | |
| 6,117,088 A | 9/2000 | Kreizman et al. | |
| 6,123,675 A | 9/2000 | Kreizman et al. | |
| 6,162,184 A | 12/2000 | Swanson et al. | |
| 6,213,995 B1 | 4/2001 | Steen et al. | |
| 6,262,372 B1 * | 7/2001 | Naegelin | H01R 13/6616 174/68.1 |
| 6,262,574 B1 * | 7/2001 | Cho | B82Y 25/00 250/227.19 |
| 6,267,746 B1 | 7/2001 | Bumbalough | |
| 6,322,559 B1 | 11/2001 | Daulton et al. | |
| 6,323,413 B1 | 11/2001 | Roth et al. | |
| 6,341,892 B1 * | 1/2002 | Schmermund | 374/185 |
| 6,343,259 B1 * | 1/2002 | Sedlak et al. | 702/58 |
| 6,354,735 B2 | 3/2002 | Thermos et al. | |
| 6,440,129 B1 | 8/2002 | Simpson | |
| 6,456,863 B1 | 9/2002 | Levin et al. | |
| 6,539,981 B1 | 4/2003 | Kleven et al. | |
| 6,547,788 B1 | 4/2003 | Maguire et al. | |
| 6,568,849 B1 * | 5/2003 | Chen et al. | 374/185 |
| 6,623,821 B1 | 9/2003 | Kendig | |
| 6,639,505 B2 | 10/2003 | Murata et al. | |
| 6,655,835 B2 | 12/2003 | Mattoon et al. | |
| 6,666,578 B2 | 12/2003 | Gibbs et al. | |
| 6,698,922 B2 | 3/2004 | Adachi et al. | |
| 6,738,566 B2 | 5/2004 | Pagnella | |
| 6,886,977 B2 | 5/2005 | Kaminski et al. | |
| 6,890,095 B2 * | 5/2005 | Gul | G01K 3/06 374/115 |
| 6,899,457 B2 * | 5/2005 | Kurano | G01K 7/22 338/28 |
| 6,899,467 B2 * | 5/2005 | McDonald | G02B 6/3869 385/72 |
| 6,977,575 B2 | 12/2005 | Bernier et al. | |
| 6,979,121 B2 * | 12/2005 | Chang | G01K 13/002 374/163 |
| 6,986,746 B2 | 1/2006 | Fox et al. | |
| 6,991,370 B2 | 1/2006 | Kofune et al. | |
| 7,029,173 B2 | 4/2006 | Engel et al. | |
| 7,053,509 B2 | 5/2006 | Ryan et al. | |
| 7,090,645 B2 | 8/2006 | Fox et al. | |
| 7,111,983 B2 * | 9/2006 | Hudson | 374/152 |
| 7,361,830 B2 | 4/2008 | Richetto et al. | |
| 7,719,400 B1 | 5/2010 | Bernier et al. | |
| 7,780,348 B2 * | 8/2010 | Houben | G01K 1/08 338/229 |
| 7,815,368 B2 * | 10/2010 | Sasaki et al. | 374/152 |
| 7,864,026 B2 | 1/2011 | Bernier | |
| 8,033,719 B2 * | 10/2011 | Beutin | F01D 17/08 374/158 |
| 8,106,741 B2 | 1/2012 | Bernier et al. | |
| 8,251,579 B2 * | 8/2012 | Lesmeister | G01K 7/16 374/141 |
| 8,305,186 B1 * | 11/2012 | Myers | H01C 7/06 338/25 |
| 8,328,419 B2 * | 12/2012 | Wienand | G01K 1/12 374/181 |
| 9,261,412 B2 * | 2/2016 | Yoshida | G01K 1/14 338/275 |
| 2002/0048312 A1 | 4/2002 | Schurr et al. | |
| 2002/0180577 A1 * | 12/2002 | Heyden et al. | 338/25 |
| 2002/0198465 A1 | 12/2002 | Fox et al. | |
| 2003/0050634 A1 | 3/2003 | Ellman et al. | |
| 2003/0209264 A1 | 11/2003 | Richetto et al. | |
| 2004/0091017 A1 * | 5/2004 | Gramsamer et al. | 374/152 |
| 2004/0094706 A1 | 5/2004 | Covey et al. | |
| 2004/0114665 A1 | 6/2004 | Park et al. | |
| 2004/0167746 A1 * | 8/2004 | Thompson et al. | 702/182 |
| 2004/0233034 A1 | 11/2004 | Bernier | |
| 2004/0238023 A1 | 12/2004 | Richetto et al. | |
| 2006/0227849 A1 * | 10/2006 | Phillips | 374/179 |
| 2006/0247726 A1 | 11/2006 | Biggs et al. | |
| 2006/0284722 A1 | 12/2006 | Bernier | |
| 2007/0019706 A1 * | 1/2007 | Hudson | 374/152 |
| 2007/0110124 A1 * | 5/2007 | Shiraki | G01K 1/08 374/208 |
| 2007/0171959 A1 * | 7/2007 | Irrgang | G01K 1/10 374/185 |
| 2008/0025839 A1 * | 1/2008 | Schilling | 416/61 |
| 2009/0044849 A1 | 2/2009 | Richetto et al. | |
| 2009/0213899 A1 * | 8/2009 | Bingham | 374/141 |
| 2010/0278213 A1 | 11/2010 | Bernier et al. | |
| 2011/0026562 A1 | 2/2011 | Bernier et al. | |
| 2013/0128925 A1 * | 5/2013 | Hoenicka | G01K 1/08 374/208 |

(56) References Cited

U.S. PATENT DOCUMENTS

2015/0078418 A1* 3/2015 Suzuki et al. ............... 374/152
2015/0337678 A1* 11/2015 Alonte et al. ............... 374/141

OTHER PUBLICATIONS

"U.S. Appl. No. 10/391,531, Non-Final Office Action mailed Aug. 29, 2006", 18 pgs.
"U.S. Appl. No. 10/391,531, Notice of Allowance mailed Nov. 28, 2007", 9 pgs.
"U.S. Appl. No. 10/391,531, Response filed Oct. 18, 2007 to Final Office Action Mailed Apr. 23, 2007", 10 pgs.
"U.S. Appl. No. 10/391,531, Response filed Feb. 26, 2007 to Non-Final Office Action mailed Aug. 29, 2006", 10 pgs.
"U.S. Appl. No. 10/801,96, Non-Final Office Action mailed Aug. 13, 2008", 13 pgs.
"U.S. Appl. No. 11/312,240, Non-Final Office Action mailed Apr. 4, 2008", 5 pgs.
"U.S. Appl. No. 11/312,240, Non-Final Office Action mailed Mar. 1, 2007", 7 pgs.
"U.S. Appl. No. 11/312,240, Response filed Jul. 7, 2008 to Non-Final Office Action mailed Apr. 4, 2008", 7 pgs.
"U.S. Appl. No. 11/312,240, Response filed Aug. 1, 2007 to Non-Final Office Action mailed Mar. 1, 2007", 12 pgs.
"U.S. Appl. No. 11/462,020, Non-Final Office Action mailed Jul. 31, 2009", 9 pgs.
"U.S. Appl. No. 11/462,020, Notice of Allowance mailed Feb. 22, 2010", 6 pgs.
"U.S. Appl. No. 11/462,020, Preliminary Amendment filed Nov. 13, 2006", 9 pgs.
"U.S. Appl. No. 11/462,020, Response filed Oct. 22, 2009 to Non-Final Office Action mailed Jul. 31, 2009" 8 pgs.
"U.S. Appl. No. 11/462,020, Restriction Requirement mailed Mar. 4, 2009", 2 pgs.
"Fluoroplastic Heat Shrink Tubing", (online) retrieved from: (retrieved on Aug. 17, 2006), 3 pgs.
"Heat Shrink Tubing—Frequently Asked Questions", (online) retrieved from Advanced Polymers, Inc. website, (retrieved on Sep. 21, 2007) 1 pg.
"Melt Definition", Webster's Third New International Dictionary, (online) retrieved from (1993), 2 pgs.
"SMT-6-12", (online) retrieved from (2006) (Retrieved on Aug. 17, 2006), 1 pg.
"Thermocouples", (online) retrieved from Pico Technologies website, (Retrieved on May 8, 1999), 3 pgs.
Advanced Polymers, Inc., "The World's Thinnest, Smallest, & Strongest Heat Shrink Tubing brochure", 2 pgs.
Lomber, S.G., et al., The Cryoloop: an adaptable reversible cooling deactivation method for behavioral or electrophysiological assessment of neural function, Journal of Neurosecience Methods, 86, (1999), 179-194.
Mark, S., "Using Thin-Wall Heat-Shrink Tubing in Medical Device Manufacturing", (online) Retrieved from (retrieved on Aug. 29, 2006), 6 pgs.
Richetto, Audeen, et al., "Multi-Point Polymer Encapsulated Micro-Thermocouple", U.S. Appl. No. 60/455,617, filed Mar. 17, 2003, 18 pgs.
"U.S. Appl. No. 12/776,655, Notice of Allowance mailed Sep. 23, 2011" 8 pgs.
U.S. Appl. No. 12/776,655, Response filed Aug. 19, 2011 to Restriction Requirement mailed Jul. 21, 2011, 6 pgs.
U.S. Appl. No. 12/776,655, Restriction Requirement mailed Jul. 21, 2011, 7 pgs.
U.S. Appl. No. 12/776,655, Supplemental Notice of Allowability mailed Nov. 16, 2011, 4 pgs.

* cited by examiner

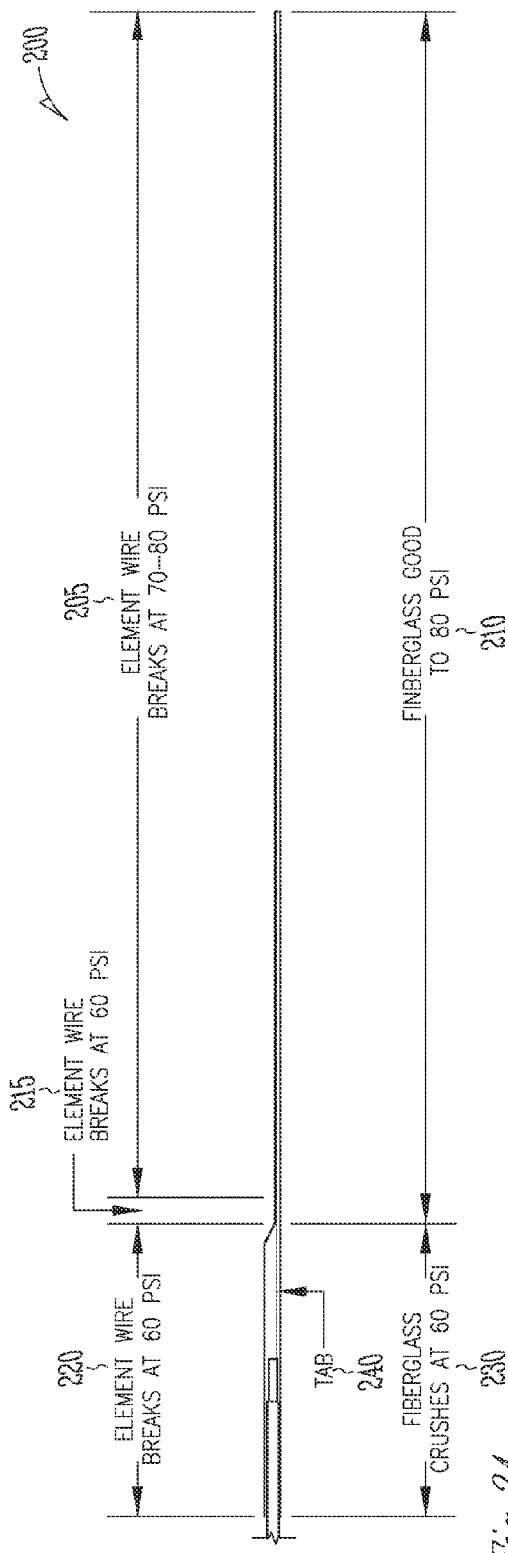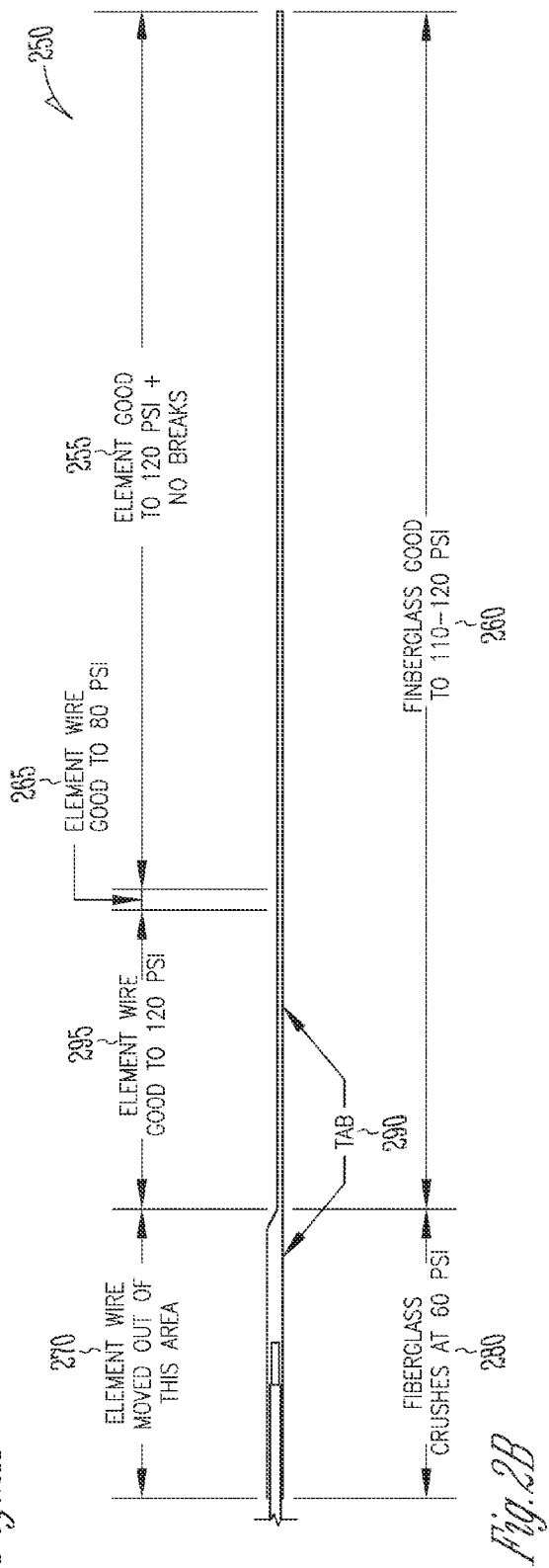
Fig. 2A
Fig. 2B

ROBUST STATOR WINDING TEMPERATURE SENSOR

RELATED APPLICATIONS

This application is a continuation of U.S. application Ser. No. 12/174,242 filed Jul. 16, 2008 (issuing as U.S. Pat. No. 8,251,579 on Aug. 28, 2012) and entitled "ROBUST STATOR WINDING TEMPERATURE SENSOR," which claims the priority benefit of U.S. Provisional Patent Application No. 60/950,066 filed Jul. 16, 2007 and entitled "ROBUST STATOR WINDING TEMPERATURE SENSOR," which are incorporated herein by reference in their entirety.

TECHNICAL FIELD

This disclosure relates generally to temperature sensors, and more particularly to systems and methods for robust temperature measurement of motor and generator stator windings.

BACKGROUND

A resistance-based temperature sensor, or resistance temperature detection element (RTD), can be used in a number of applications to measure operating temperature based on a sensed change in resistance in one or more wires incorporated into the sensor. When connected to a stator, an RTD can be used to detect temperatures in the windings, airstreams, and gas streams of motors, generators, and auxiliary equipment.

To connect an RTD to a stator, the RTD is installed between coils or windings inside the stator. The RTD may be installed completely inside a slot with only insulated wires protruding past the edge of the stator core. This type of RTD combines a thin fiberglass body material with relatively large leads that do not fit inside the fiberglass body, requiring a "lead step" of fiberglass material be manufactured on the lead wire end. The resulting combination of this fiberglass with a lead step makes the RTD's installation process and positioning inside a motor or generator different than other applications and susceptible to damage during motor or generator manufacturing. What is needed is a robust stator winding temperature sensor.

SUMMARY

Disclosed herein, among other things, is a stator winding temperature sensor. According to an embodiment, the sensor includes at least one sensing wire coil. The sensing wire coil is adapted to be connected to a stator to sense temperature of the stator. The sensor embodiment also includes a fiberglass body, including a core material surrounding at least a portion of the sensing wire coil, and an epoxy laminate material over the core material. The fiberglass body has a thickness adapted to protect the sensing wire coil. The sensor embodiment further includes a lead wire adapted to connect to an external monitoring device. A lead step portion of the sensor is where the sensing wire coil is electrically connected to the lead wire. In addition, the sensor embodiment includes a tab extending from the lead wire and encompassing the lead step. The tab protects the lead step and the sensing wire coil in a region where the sensor extends over an end of the stator.

Disclosed herein, among other things, is a system using an external monitoring device for measuring motor or generator operating temperature. The system includes a stator winding temperature sensor friction fit to the stator. The sensor includes a sensor body housing one or more sensor wires and a lead wire electrically connected to the sensor wires and adapted to connect to the external monitoring device. An elongated tab extends from the lead wire and encompasses a portion of the sensor wires in a region where the sensor wires extend over an end of the stator.

Disclosed herein, among other things, is a method for manufacturing a temperature sensor for sensing temperature of a stator. A sensing wire coil is fitted to the stator to sense temperature of the stator. At least a portion of the sensing wire coil is surrounded with a fiberglass body having a core material and an epoxy laminate material over the core material. A lead wire is electrically connected to an external monitoring device. The sensing wire coil is electrically connected to the lead wire at a lead step. A tab is provided extending from the lead wire and encompassing the lead step to protect the lead step and the sensing wire coil in a region where the sensor extends over an end of the stator.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 2A illustrates a diagram of a stator winding temperature sensor, showing structural strength of regions of the sensor.

FIG. 2B illustrates a diagram of a stator winding temperature sensor, showing structural strength of regions of the sensor, according to an embodiment of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

A resistance-based temperature sensor, or resistance temperature detection element (RTD), can be used in a number of applications to measure operating temperature based on a sensed change in resistance in one or more wires incorporated into the sensor. When connected to a stator, an RTD can be used to detect temperatures in the windings, airstreams, and gas streams of motors, generators, and auxiliary equipment.

To connect an RTD to a stator, the RTD is installed between coils or windings inside the stator. The RTD may be installed completely inside a slot with only insulated wires protruding past the edge of the stator core. This type of RTD combines a thin fiberglass body material with relatively large leads that do not fit inside the fiberglass body, requiring a "lead step" of fiberglass material be manufactured on the lead wire end. The resulting combination of this fiberglass with a lead step makes the RTD's installation process and positioning inside a motor or generator different than other applications and susceptible to damage during motor or generator manufacturing.

Figure 1A:
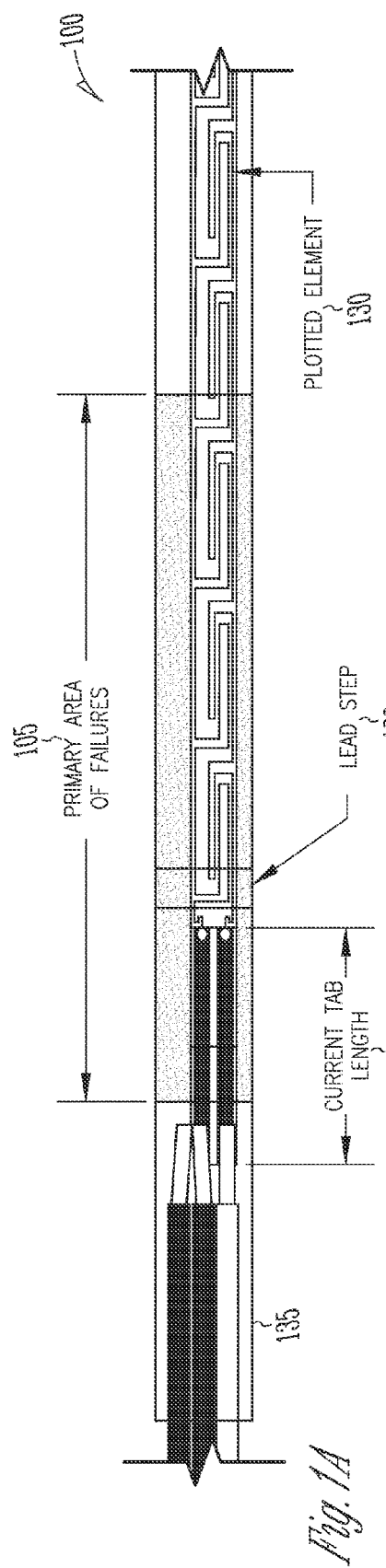
FIG. 1A illustrates a schematic diagram of a stator winding temperature sensor.
Figure 3A:
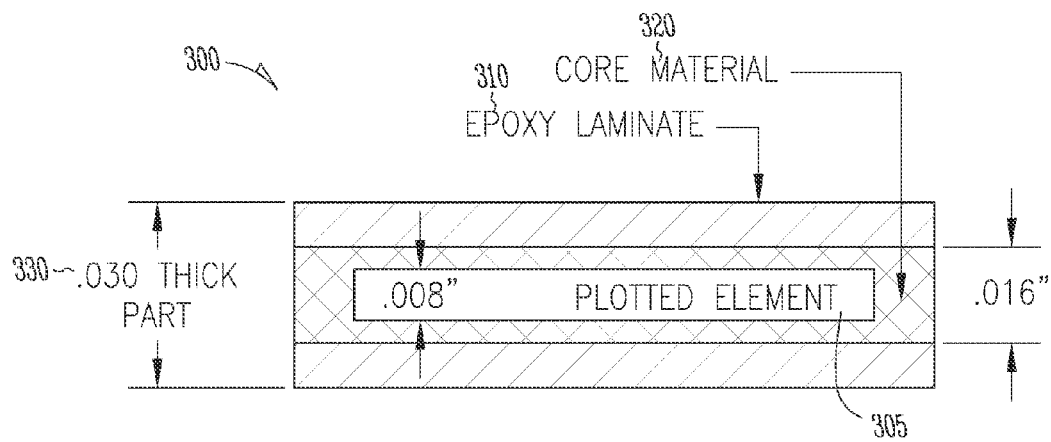
FIG. 3A illustrates a schematic diagram of a body portion of a stator winding temperature sensor.

Other stator RTDs exhibited tensile failures during installation and manufacturing, as RTDs are friction fit to the stator windings. The cause of these failures can be linked to stress on the RTD sensing wire caused by the installation process, which can include pressure, blows with rubber mallets, and bending of the lead end/lead step area of the RTD at the edge of the stator core. FIG. 1A illustrates a schematic diagram of a stator winding temperature sensor 100. A primary area of failure 105 is shown, including a loud step 120 connecting lead wires 135 with plotted elements (thin wire coils for sensing) 130. The tab 110 does not protect the lead step 120, nor does it protect other significant portions of the primary failure area 105. FIG. 2A illustrates a diagram of a stator winding temperature sensor 200, showing structural strengths (and weaknesses) of regions of the sensor. Element wire section 205 breaks at 70-80 pounds per square inch (PSI), element wire sections 215 and 220 breaks at 60 PSI, fiberglass section 210 is good to 65 PSI, while fiberglass section 230 crushes at 60 PSI. Tab section 240 does not protect the element wire section 215. FIG. 3A illustrates a schematic diagram of a body portion 300 of a stator winding temperature sensor. Plotted element (sensing wire) 305 is surrounded by a thickness of core material 320, which has surrounding layers of epoxy laminate 310. The overall thickness 330 of the body portion is 0.030 inches. The 0.030 inch thick fiberglass body, when used with an 18 gage wire lead step, makes the part susceptible to damage of the small diameter sensing coil (plotted element). The sensor is bent around the edge of the stator core during installation and operation, as the sensors are placed over and under the stator coils. What is needed is a robust stator winding temperature sensor.

Various embodiments of the present subject matter are related to stator winding temperature sensors. These sensors are connected to coils or windings of stators in motors, generators, and auxiliary equipment to sense temperature. A "pinch zone" exists where the sensor exits the core of the motor or generator, at the end of the stator. The present subject matter provides for elongated tabs to protect the small diameter sensing wire in the vicinity of the pinch zone. The elongated tab is part of the sensor subassembly and repositions the small diameter sensing wire away from the susceptible areas of damage. The elongated tab technique also makes the position of the tab to sensing wire joint visible by moving this joint out from under the lead step area. This feature enables motor and generator assemblers to consistently position the RTD sensor and avoid hitting the coils in the vulnerable area. The overall sensor is thus stronger and provides a visible joint location to allow for more precise installation, further reducing the likelihood of damage and sensor failure.

A "strike zone" exists along a slot under the coils of the stator where the sensor is placed and struck with a mallet, to physically connect the sensor into the slots. This portion of the RTD sensor is currently subject to damage when the coils are struck to wedge the coils into place inside the motor or generator stator slot. The damage causes localized tensile failures in the relatively small diameter sensing wire inside the sensor. The 0.030 inch thick fiberglass body is too thin to provide adequate protection, and thus these parts fail. The present subject matter provides for a more robust sensor body, or thicker layer of material over the sensor, in the strike zone and the pinch zone to protect the small diameter sensing wire. According to an embodiment, a 0.040 inch thick fiberglass body is used to provide more protection to the sensing wire. Testing of the sensors has provided the following data:

| Pressure Applied | Wire Damage/RTD Failure | | Fiberglass Damage | |
|---|---|---|---|---|
| | .030" thick | .040" thick | .030" thick | .040" thick |
| 40 psi | No | No | No | No |
| 60 psi | Yes | No | No | No |
| 80 psi | Yes | No | No | No |
| 100 psi | Yes | No | No | No |
| 120 psi | Yes | No | Yes | Yes |

This shows that the present subject matter increases the strength of the internal sensing wires to at least 120 PSI. In addition, external fiberglass damage is visible before damage to the internal sensing wires is sustained. This allows for detection of over-stressing the sensor and facilitates process improvement and prevention of future damage. Because end users typically provide an upper limit to the thickness of the sensor body (limited by the dimensions of the stator openings), the thickness of the protective material around the sensing wires is limited.

Disclosed herein, among other things, is a stator winding temperature sensor. According to an embodiment, the sensor includes at least one sensing wire coil. The sensing wire coil includes platinum wires, in an embodiment. The sensing wire coil is adapted to be connected to a stator to sense temperature of the stator (of a motor or generator, for example). The sensor embodiment also includes a fiberglass body, including a core material surrounding at least a portion of the sensing wire coil, and an epoxy laminate material over the core material. The fiberglass body has a thickness adapted to protect the sensing wire coil. According to an embodiment, the fiberglass body has a thickness of 0.040 inches to protect the sensing wire coil in the pinch zone and the strike zone. The sensor embodiment further includes a lead wire adapted to connect to an external monitoring device. The lead wire includes an 18 gage lead wire, in an embodiment. A lead step portion of the sensor is where the sensing wire coil is electrically connected to the lead wire. In addition, the sensor embodiment includes a tab extending from the lead wire and encompassing the lead step. The tab protects the lead step and the sensing wire coil in a region where the sensor extends over an end of the stator. According to an embodiment, the tab section is 2.375 inches in length to protect the sensing wire coil in the pinch zone.

Figure 1B:
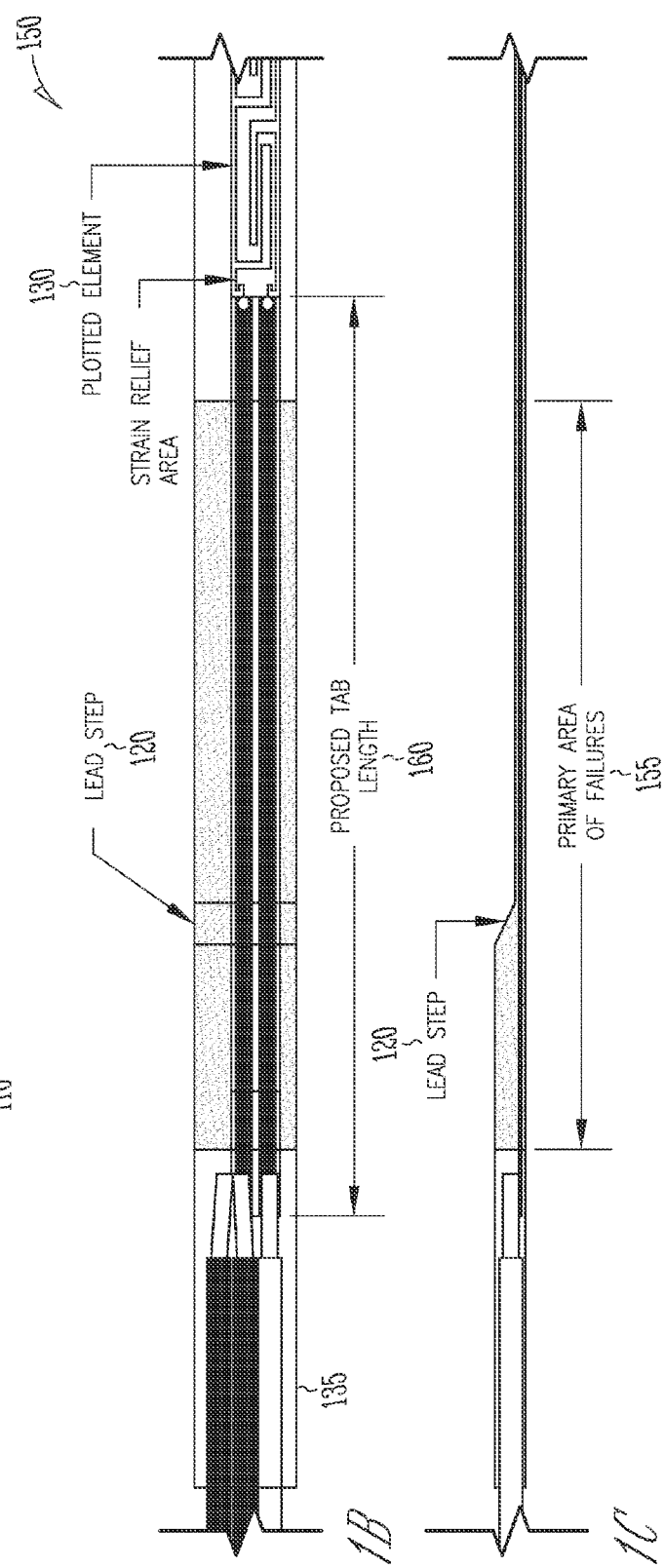
FIG. 1B illustrates a schematic diagram of a top view of a stator winding temperature sensor, according to an embodiment of the present subject matter.
Figure 1C:
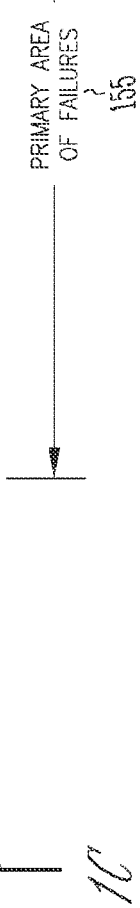
FIG. 1C illustrates a schematic diagram of a side view of a stator winding temperature sensor, according to an embodiment of the present subject matter.

FIG. 1B illustrates a schematic diagram of a top view of a stator winding temperature sensor 150, according to an embodiment of the present subject matter. A primary area of failure 155 is shown, including a lead step 120 connecting lead wires 135 with plotted elements (thin wire coils for sensing) 130. The tab 160 protects the lead step 120, plus other significant portions of the primary failure area 155. FIG. 1C illustrates a schematic diagram of a side view of a stator winding temperature sensor, according to an embodiment of the present subject matter. The lead step 120 and primary area of failures 155 are shown within the proposed tab length 160.

FIG. 2B illustrates a diagram of a stator winding temperature sensor 250, showing structural strength of regions of the sensor, according to an embodiment of the present subject matter. A body thickness of 0.040 inches and tab length of 2.375 inches are used in this embodiment. Element wire sections 255 and 295 are good (no breaks) up to 120 PSI, element wire section 265 breaks at 80 PSI, element wire is moved out of section 270 in this embodiment, fiberglass section 260 is good to 110-120 PSI, while fiberglass section 280 crushes at 60 PSI. Elongated tab section 290 provides protection for the element wire sections, and the increased body thickness likewise provides protection to reduce failures.

Figure 3B:
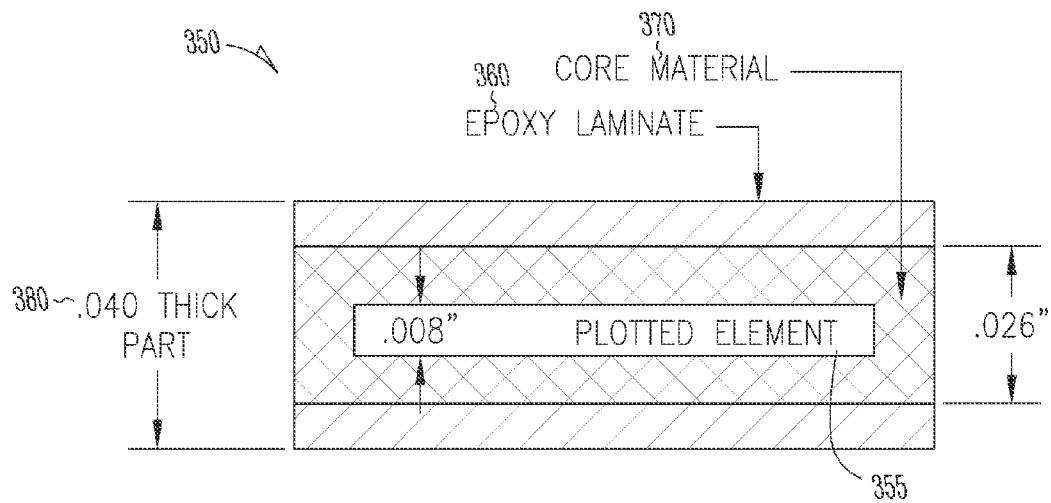
FIG. 3B illustrates a schematic diagram of a body portion of a stator winding temperature sensor, according to an embodiment of the present subject matter.

FIG. 3B illustrates a schematic diagram of a body portion 350 of a stator winding temperature sensor, according to an embodiment of the present subject matter. Plotted element (sensing wire) 355 is surrounded by a thickness of core material 370, which has surrounding layers of epoxy laminate 360. The overall thickness 380 of the body portion is 0.040 inches, in the depicted embodiment. Other thicknesses may be used without departing from the scope of this disclosure.

Figure 4:
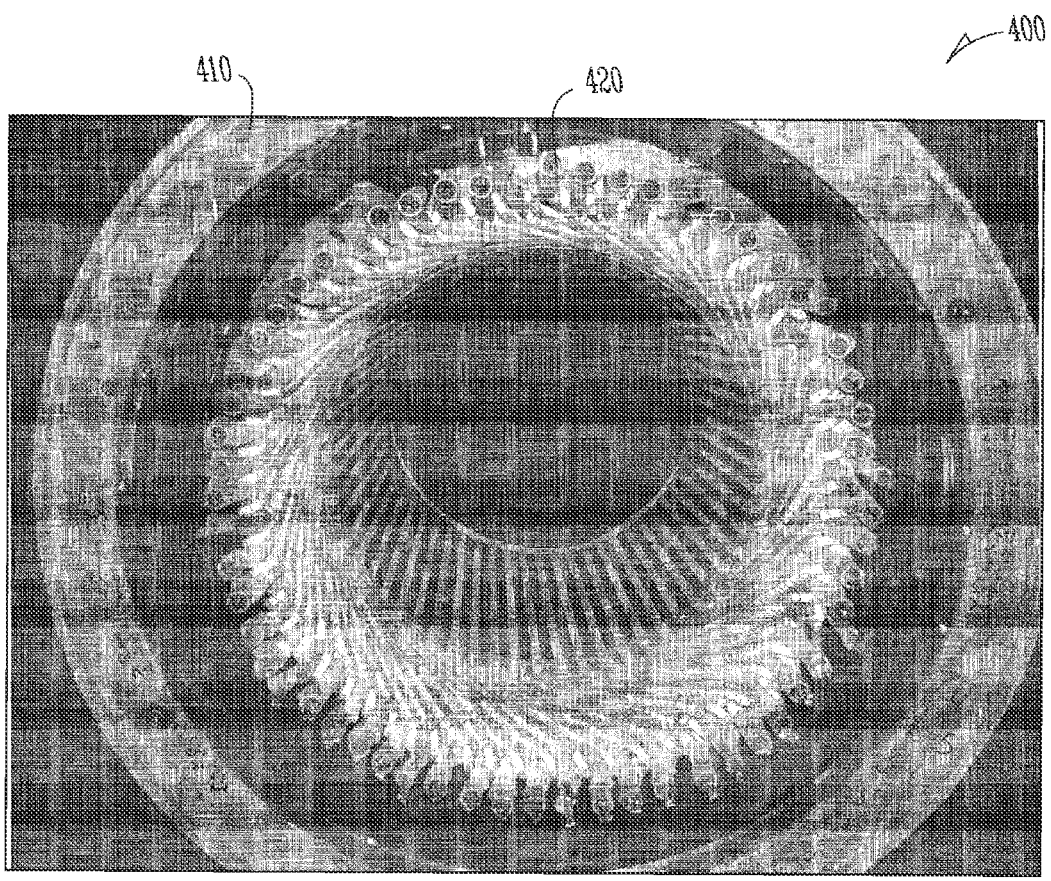
FIG. 4 illustrates an end-view of a system including a stator winding temperature sensor, according to an embodiment of the present subject matter.
Figure 5:
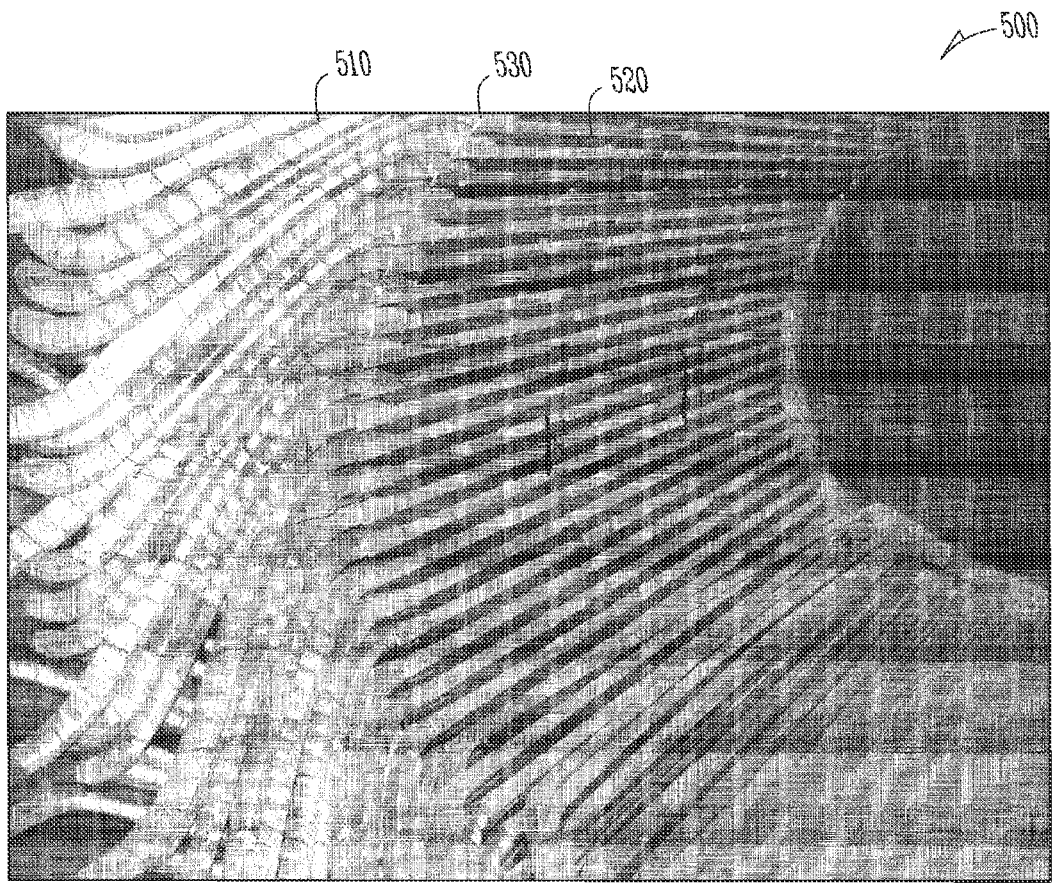
FIG. 5 illustrates a side-view of a system including a stator winding temperature sensor, according to an embodiment of the present subject matter.

FIG. 4 illustrates an end-view of a system including a stator winding temperature sensor 400, according to an embodiment of the present subject matter. Sensor lead wires 420 are shown extending beyond the end of stator 410. FIG. 5 illustrates a side-view of a system including a stator winding temperature sensor 500, according to an embodiment of the present subject matter. Sensor lead wires 510 are shown connected to sensor bodies 520, the bodies housing smaller diameter sensing wires, such as platinum wires in an embodiment. The tab 530 protects the sensing wires in the vicinity of the end of the stator, or pinch zone. According to an embodiment, the stator winding temperature sensor shown in FIGS. 4 and 5 has a tab as depicted in FIG. 1B and body as depicted in FIG. 3B.

Although specific embodiments have been illustrated and described herein, it will be appreciated by those of ordinary skill in the art that any arrangement which is calculated to achieve the same purpose may be substituted for the specific embodiment shown. It is to be understood that the above description is intended to be illustrative, and not restrictive. The scope of the present subject matter should be determined with reference to the appended claims, along with the full scope of equivalents to which such claims are entitled.

The invention claimed is:

1. A temperature sensor for sensing temperature of a stator, comprising:
at least one sensing wire, the sensing wire adapted to be fit to the stator and adapted to sense temperature of the stator;
a lead wire electrically connected to the sensing wire via a tab;
a protective body including:
a first portion having a first thickness surrounding at least a portion of the sensing wire;
a second portion having a second thickness, greater than the first thickness, surrounding at least a portion of the lead wire; and
a lead step defined as a portion of the protective body between the first portion of the protective body and the second portion of the protective body,
wherein the tab is arranged within the protective body and extends from the first portion of the protective body to the second portion of the protective body encompassing the lead step, wherein the tab protects the lead step and the sensing wire in a region where the sensor extends over an end of the stator.

2. The sensor of claim 1, wherein the at least one sensing wire includes a platinum sensing wire.

3. The sensor of claim 1, wherein the sensing wire is adapted to be friction fit to a stator.

4. The sensor of claim 1, wherein the protective body comprises a fiberglass body, and wherein a thickness of the first portion of the fiberglass body is approximately 0.04 inches.

5. The sensor of claim 1, wherein the protective body comprises a fiberglass body, and wherein a thickness of the first portion of the fiberglass body is greater than approximately 0.04 inches.

6. The sensor of claim 1, wherein the lead wire includes an 18 gage lead wire.

7. The sensor of claim 1, wherein a length of the tab is approximately 2.375 inches.

8. A system for measuring operating temperature of a motor or generator having a stator, comprising:
a stator winding temperature sensor, the sensor including:
a first sensor body section housing one or more sensing wires;
a second sensor body section having a thickness greater than a thickness of the first sensor body section for housing a lead wire adapted to connect to an external monitoring device;
a lead step defined as a third sensor body section arranged between the first sensor body section and the second sensor body section; and
a tab connected at a first end thereof to the one or more sensing wires at a first location within the first sensor body section, and connected at a second end thereof to the lead wire at a second location within the second sensor body section such that the tab encompasses the lead step.

9. The system of claim 8, wherein the stator winding temperature sensor is adapted to measure operating temperature of the stator based on a sensed change in resistance in the one or more sensing wires.

10. The system of claim 8, wherein the lead wire includes an 18 gage lead wire.

11. The system of claim 8, wherein a length of the tab is approximately 2.375 inches.

12. The system of claim 8, wherein a length of the tab is greater than approximately 2.375 inches.

13. The system of claim 8, wherein the one or more sensing wire includes a platinum sensor wire.

14. A method for manufacturing a temperature sensor for sensing temperature of a stator, comprising:
surrounding at least a portion of a sensing wire with a first protective body having a first thickness;

surrounding at least of portion of a lead wire with a second protective body having a second thickness greater than the first thickness;

electrically connecting the sensing wire to the lead wire with an elongated tab;

the elongated tab being surrounded with a lead step defined as a third protective body between the first protective body and the second protective body, wherein the elongated tab extends from within the first protective body to within the second protective body such that the tab encompasses the lead step, to protect the sensing wire in a region where the sensor extends over an end of the stator;

fitting the sensing wire to the stator to sense temperature of the stator; and electrically connecting the lead wire to an external monitoring device.

15. The method of claim 14, wherein fitting the sensing wire to the stator includes friction fitting the sensing wire to the stator.

16. The method of claim 14, wherein fitting the sensing wire to the stator includes fitting a platinum sensing wire to the stator.

17. The method of claim 14, wherein surrounding at least a portion of the sensing wire with a first protective body includes surrounding a coil of the sensing wire with a fiberglass body having a thickness of greater than approximately 0.04 inches.

18. The method of claim 14, wherein electrically connecting the lead wire includes electrically connecting an 18 gage lead wire.

19. The method of claim 14, wherein the elongated tab comprises a length of at least approximately 2.375 inches.

* * * * *